US010432465B2

(12) United States Patent
Jenkins et al.

(10) Patent No.: US 10,432,465 B2
(45) Date of Patent: Oct. 1, 2019

(54) AUTOMATIC PROVISIONING OF A NETWORK ACCESS POINT

(71) Applicant: Charter Communications Operating, LLC, St. Louis, MO (US)

(72) Inventors: Jelani K. Jenkins, Riverview, FL (US); Holly A. Hinze, Lutz, FL (US); Tim Gay, Tampa, FL (US); Michael Jaber, Riverview, FL (US)

(73) Assignee: Charter Communications Operating, LLC, St. Louis, MO (US)

( * ) Notice: Subject to any disclaimer, the term of this patent is extended or adjusted under 35 U.S.C. 154(b) by 139 days.

(21) Appl. No.: 15/331,128

(22) Filed: Oct. 21, 2016

(65) Prior Publication Data

US 2018/0115460 A1 Apr. 26, 2018

(51) Int. Cl.
*H04L 12/50* (2006.01)
*H04L 12/24* (2006.01)

(52) U.S. Cl.
CPC ........ *H04L 41/084* (2013.01); *H04L 41/0853* (2013.01); *H04L 41/0886* (2013.01); *H04L 41/5074* (2013.01)

(58) Field of Classification Search
CPC ...................................... H04J 12/56
USPC ....................................... 370/329
See application file for complete search history.

(56) References Cited

U.S. PATENT DOCUMENTS

| | | |
|---|---|---|
| 7,350,077 B2 | 3/2008 | Meier et al. |
| 8,385,230 B2 | 2/2013 | Kuehnel et al. |
| 8,392,712 B1 | 3/2013 | Wilson |
| 8,402,111 B2 | 3/2013 | Raleigh |
| 8,447,843 B2 | 5/2013 | Johnson et al. |
| 8,510,801 B2 | 8/2013 | Majmundar et al. |
| 8,634,821 B2 | 1/2014 | Raleigh |
| 8,649,297 B2 | 2/2014 | Ahlers et al. |

(Continued)

OTHER PUBLICATIONS

O'Dowd, Elizabeth, "Proxim Wireless Releases Powerful New Wireless Management Solution," 802.11ac Wireless Network News, May 18, 2016, http://solutionsreview.com/wirelessnetwork/proxim wirelessreleasespowerfulnewwirelessmanagementsolution/, Solutions Review, pp. 1-5.

(Continued)

*Primary Examiner* — Dang T Ton
(74) *Attorney, Agent, or Firm* — Withrow & Terranova, PLLC (57) ABSTRACT

A control system for automatic provisioning of a network access point comprises a processor device that receives network configuration data from a first computing device. The network configuration data includes a first network parameter value for a first network parameter. The control system also receives, from a second computing device, a request to provision a network access point with the first network parameter value for the first network parameter and with a second network parameter value for a second network parameter. The first network parameter and second network parameter are different from each other. The control system automatically generates the second network parameter value based on the request and the first network parameter value. The control system next provides the first network parameter value and the second network parameter value to the network access point.

21 Claims, 10 Drawing Sheets

(56) References Cited

U.S. PATENT DOCUMENTS

2004/0133689 A1    7/2004  Vasisht
2012/0120802 A1\*  5/2012  Mach ................... H04W 28/02
                                                                                          370/235

OTHER PUBLICATIONS

Zimmerman, Tim et al., "Magic Quadrant for the Wired and Wireless LAN Access Infrastructure," Gartner, Sep. 3, 2013, http://www.gartner.com/technology/reprints.do?id=1-1J65H5D&ct=130904&st=sb, Gartner, Inc., pp. 1-13.

\* cited by examiner

Customer - Info

| | | | | |
|---|---|---|---|---|
| Account Number: 052673201 | | Name: TA TEST - BIZ ENGINEERING OFFICE | Division: | Tampa |
| Address Line1: 700 CARILLON PKWY | | Line 2: STE 5 | Line 3: | |
| City: SAINT PETERSBURG | | State: FL | Zip Code: | 33716 |

Device Manager

WLANs

| SSID | Name | Description | Access Code? |
|---|---|---|---|
| Biz Engineering Bus | Business-Biz Engineering Bus | Business-Biz Engineering Bus | Yes |
| Biz Engineering Guest | Guest-Biz Engineering Guest | Guest-Biz Engineering Guest | Yes |

Business Password Reset
New Password
Password Confirm
Password guidelines
 Minimum 8 characters
 Alphanumeric (a-zA-Z0-9)
 Special characters like
 !@#$%^&*()_+~,=<>?\|{}[],:;"''

Access Points

| MAC | Location | Name | Description | Model | Serial | Status | F7 or New Item |
|---|---|---|---|---|---|---|---|

[Submit] [Close]

Device Manager - Search

AUTOMATIC PROVISIONING OF A NETWORK ACCESS POINT

TECHNICAL FIELD

The disclosure is directed to the provisioning of a computing device, and in particular, automatically provisioning a network access point.

BACKGROUND

Provisioning computing devices, such as network access points in a network, can be a time-consuming process, requiring manual entry of a large number of different parameter values for each network access point in the network. As the number of network access points in the network increases, the time and effort required to install and provision the network access points also increases. In addition, because the parameter values must be manually entered for each individual network access point, an increase in the number of network access points also increases the possibility of human error when manually entering the parameter values. Thus, there is a need to increase accuracy and to reduce the time required to provision network access points in a network.

SUMMARY

The disclosure is directed to the provisioning of a computing device, and in particular, automatically provisioning a network access point. A control system having a processor device receives network configuration data from a first computing device. The network configuration data includes a first network parameter value for a first network parameter. The control system also receives, from a second computing device, a request to provision a network access point with the first network parameter value for the first network parameter and with a second network parameter value for a second network parameter. The first network parameter and second network parameter are different from each other. The control system automatically generates the second network parameter value based on both the request and the first network parameter value. The control system next provides the first network parameter value and the second network parameter value to the network access point to provision the network access point.

One advantage of this embodiment is that the control system is able to fully provision a network access point without requiring manual entry of a large subset of required network parameter values. Unlike conventional systems, which require manual entry of network parameter values for each network access point, an installer can use a portable remote manager device to send a request to the control system to provision an installed network access point using minimal identifying information for the network access point, such as, for example, a bar code identifier and/or a media access control (MAC) address. The control system stores predetermined network parameter values, in a database for example, and automatically generates additional network parameter values based on the information included in the request and on the predetermined network parameter values already stored in the database. In this manner, the control system automatically provides all of the required network parameter values to the network access point, thereby eliminating the possibility of provisioning errors arising from manual input of the generated network parameter values.

According to one embodiment, a method of automatically provisioning a network access point is disclosed. The method comprises receiving, by a control system comprising a processor device, network configuration data from a first computing device, the network configuration data comprising a first network parameter value for a first network parameter. The method further comprises receiving, by the control system from a second computing device, a request to provision a network access point with the first network parameter value for the first network parameter and with a second network parameter value for a second network parameter different from the first network parameter. The method further comprises automatically generating, by the control system, the second network parameter value based on the request and the first network parameter value. The method further comprises providing, by the control system to the network access point, the first network parameter value and the second network parameter value.

According to another embodiment, a controller device for automatically provisioning a network access point is disclosed. The controller device comprises a processor device, a memory, and a network interface unit. The network interface unit is configured to receive network configuration data from a first computing device, the network configuration data comprising a first network parameter value for a first network parameter. The network interface unit is further configured to receive, from a second computing device, a request to provision a network access point with the first network parameter value and with a second network parameter value for a second network parameter different from the first network parameter. The memory includes computer-readable instructions configured to automatically direct the processor device to generate the second network parameter value based on the request and the first network parameter value, and provide the first network parameter value and the second network parameter value to the network access point.

According to another embodiment, a network system is disclosed. The network system comprises a network access point. The network system further comprises a controller device comprising a processor device, a memory, and a network interface unit. The network interface unit is configured to receive network configuration data from a first computing device, the network configuration data comprising a first network parameter value for a first network parameter. The network interface unit is further configured to receive, from a second computing device, a request to provision the network access point with the first network parameter value and with a second network parameter value for a second network parameter different from the first network parameter. The memory comprises computer-readable instructions configured to automatically direct the processor device to generate the second network parameter value based on the request and the first network parameter value, and provide the first network parameter value and the second network parameter value to the network access point.

According to another embodiment, a non-transitory computer-readable medium is disclosed. The non-transitory computer-readable medium comprises machine-readable instructions for directing a processor device to perform a method. The method comprises receiving, from a first computing device, network configuration data comprising a first network parameter value for a first network parameter. The method further comprises receiving, from a second computing device, a request to provision a network access point with the first network parameter value and with a second network parameter value for a second network parameter different from the first network parameter. The method further comprises automatically generating the second network parameter value based on the request and the first network parameter value. The method further comprises providing the first network parameter value and the second network parameter value to the network access point.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first computing device" and "second computing device," and does not imply a priority, a type, an importance, or other attribute, unless otherwise stated herein. As used herein and in the claims, the articles "a" and "an" in reference to an element refers to "one or more" of the element unless otherwise explicitly specified.

The disclosure is directed to the provisioning of a computing device, and in particular, automatically provisioning a network access point. A control system having a processor device receives network configuration data from a first computing device. The network configuration data includes a first network parameter value for a first network parameter. The control system also receives, from a second computing device, a request to provision a network access point with the first network parameter value for the first network parameter and with a second network parameter value for a second network parameter. The first network parameter and second network parameter are different from each other. The control system automatically generates the second network parameter value based on both the request and the first network parameter value. The control system next provides the first network parameter value and the second network parameter value to the network access point to provision the network access point.

One advantage of this embodiment is that the control system is able to fully provision a network access point without requiring manual entry of a large subset of required network parameter values. Unlike conventional systems, which require manual entry of network parameter values for each network access point, an installer can use a portable remote manager device to send a request to the control system to provision an installed network access point using minimal identifying information for the network access point, such as, for example, a bar code identifier and/or a media access control (MAC) address. The control system stores predetermined network parameter values, in a database for example, and automatically generates additional network parameter values based on the information included in the request and on the predetermined network parameter values already stored in the database. In this manner, the control system automatically provides all of the required network parameter values to the network access point, thereby eliminating the possibility of provisioning errors arising from manual input of the generated network parameter values.

In one embodiment, for example, the network configuration data may include a customer name value as the first network parameter value, which is input and stored in the control system via an account manager device in communication with the control system. The control system later receives, via a remote manager device, a request to provision a network access point with a number of network parameters, including the customer name value (e.g., "BRIGHTHOUSE"). In response to the request, the control system automatically generates network parameter values for additional network parameters, such as a network access point name or login information based on the stored customer name value. In one example, a network access point name for each network access point may include a portion of the customer name and a unique component associated with a respective network access point (e.g., "BRIGHTHOUSE01, BRIGHTHOUSE02," etc.). By automatically generating and providing additional network parameter values based on a subset of stored network parameter values, groups of network access points can be efficiently and accurately provisioned.

Figure 1:
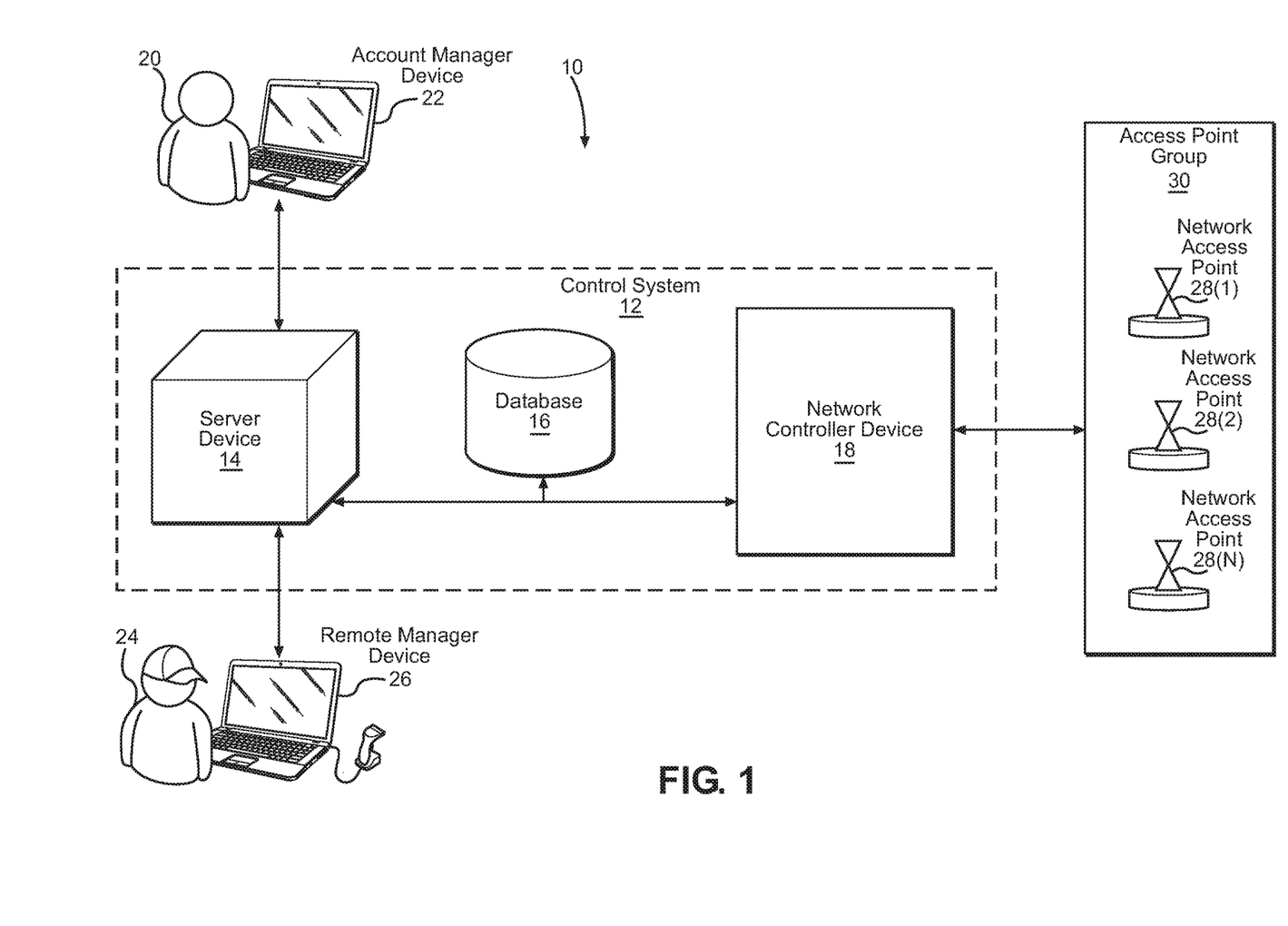
FIG. 1 is a schematic diagram of a system for provisioning a plurality of network access points in a network, according to an embodiment.

In this regard, FIG. 1 is a schematic diagram of a network system 10 for provisioning a plurality of network access points in a network, according to an embodiment. The network system 10 includes a control system 12, which may include one or more devices, such as a server device 14 (e.g. a web server), in communication with a database 16. The control system 12 may also include one or more network controller devices 18. The network controller device 18 may be in communication with the server device 14 and/or the database 16. In one embodiment, an implementation team member 20 provides network configuration data into the control system 12 via an account manager device 22. As will be described in greater detail with respect to FIG. 2 below, the network configuration data comprises a first network parameter value for a first network parameter. The account manager device 22 may be a desktop PC, a network terminal, or other type of computing device, for example, configured to communicate the network configuration data to the control system 12. In this embodiment, for example, the account manager device 22 provides the network configuration data to the server device 14, which stores the network configuration data in the database 16, and/or provides the network configuration data to the network controller device 18.

In this embodiment, the control system 12 also receives, from a field technician 24 using a remote manager device 26, a request to provision one or more network access points 28(1)-28(N) (generally, network access points 28) with a plurality of network parameter values, including the first network parameter value for the first network parameter and a second network parameter value for a second network parameter. In this embodiment, the first network parameter and the second network parameter are different from each other. For example, as discussed in greater detail below, the first network parameter may include one or more of an account number, a customer name, a customer address, a network name, a user name, or a user password, etc., while the second network parameter may include one or more of a network address of the network access point, a MAC address of the network access point, a serial number of the network access point, or a location of the network access point, etc.

The remote manager device 26 may be a portable PC, a tablet, or another type of computing device, for example. In this embodiment, the remote manager device 26 is used by the field technician 24 or on-site installer in close proximity to the network access point(s) 28 being installed or serviced for convenience and ease of access to the network access point(s) 28, but it should be understood that neither the field technician 24, nor the remote manager device 26 are required to be in close proximity to the network access point(s) 28.

In response to the remote manager device 26 providing the request, the control system 12 automatically generates the second network parameter value based on the request and the first network parameter value. The control system 12 then provides the first network parameter value and the second network parameter value to the network access point(s) 28. In this manner, an access point group 30 of the network access point(s) 28 may be quickly and accurately installed and provisioned without requiring manual entry of a large subset of required parameter values.

In some embodiments, the request may only include minimal identifying information for the network access point(s) 28, such as, for example, a bar code identifier and/or a MAC address. The control system 12 is able to automatically generate the second network parameter value based on the identifying information included in the request and on the first network parameter value. The control system 12 then automatically provides all of the required network parameter values to the network access point(s) 28, thereby reducing the possibility of provisioning errors arising from manual input of the required network parameter values.

Figure 2:
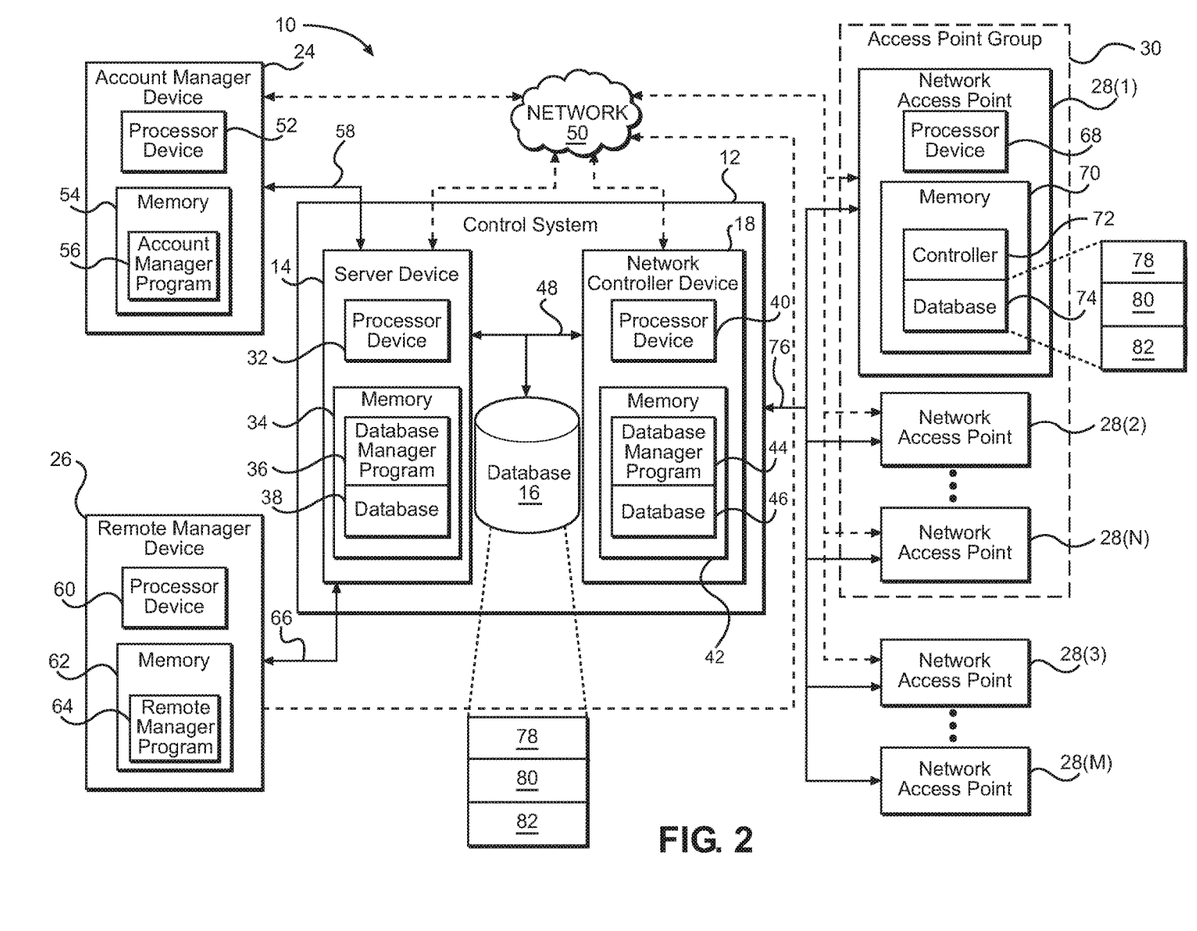
FIG. 2 is a schematic diagram of the system illustrated in FIG. 1, illustrating additional details and component features thereof, according to an embodiment.

In this regard, FIG. 2 is a schematic diagram of the network system 10 illustrated in FIG. 1, illustrating additional details and component features thereof, according to an embodiment. In this embodiment, the server device 14 includes a processor device 32 and a memory 34 in communication with the processor device 32. The memory 34 may store one or more programs such as a database manager program 36 for managing data stored on a database 38, and/or on the centralized database 16.

The control system 12 in this embodiment also includes the network controller device 18, which also includes a processor device 40 in communication with a memory 42. In this embodiment, the memory 42 includes its own database manager program 44 for managing data on an onboard database 46, and/or the centralized database 16. In some embodiments, the network controller device 18 may include one or more Ruckus® SmartCell™ Gateway devices, for example.

In this embodiment, the server device 14, the centralized database 16, and the network controller device 18 are in communication with each other via a hardwired link 48. Alternatively, or in addition, the server device 14, the centralized database 16, and/or the network controller device 18 may also be in communication with each other via a network 50, which may be a wired and/or wireless network, such as the Internet, for example.

In this embodiment, the account manager device 22 is a standalone device that is separate from the server device 14. In some embodiments, however, the account manager device 22 may be part of the server device 14, or may be otherwise integrated into the control system 12. In this embodiment, the account manager device 22 includes a processor device 52 in communication with a memory 54. The memory 54 includes an account manager program 56, which may also be referred to herein as an account manager, comprising computer-readable instructions for directing the processor device 52 to provide the network configuration data to the control system 12, via a hardwired link 58 and/or the network 50, as desired.

Similarly, the remote manager device 26 may also be a standalone device, and/or integrated into one or more components of the control system 12, as desired. The remote manager device 26 includes a processor device 60 in communication with a memory 62. The memory 62 contains a remote manager program 64, which may also be referred to herein as a remote manager, a device manager, or a device manager program, comprising computer-readable instructions for directing the processor device 60 to provide a request to the control system 12 to provision one or more network access points 28. In this example, the request may be provided via a hardwired link 66 and/or via the network 50. The control system 12 then uses the network configuration data received from the account manager device 22 and the request received from the remote manager device 26 to generate additional network parameter values, which are then used in provisioning one or more network access points 28.

Each network access point 28 includes a processor device 68 in communication with a memory 70. The memory 70 in this embodiment includes a controller 72 comprising computer-readable instructions for directing the processor device 68 to access a database 74 and to perform various conventional functions of the network access point 28. In this embodiment, the provisioning process populates the database 74, via one or more links 76 and/or via the network 50, with a plurality of network parameter values and device parameter values, including, for example, a first network parameter value 78 provided by the account manager device 22 as part of the network configuration data, and a second network parameter value 80 generated by the control system 12 based on the first network parameter value 78. The database 74 may also store one or more device parameter values 82 that may be provided to the control system 12 by the remote manager device 26 as part of the provisioning request, and which may also be used by the control system 12 in generating the second network parameter value 80. Some or all of these network parameter values 78, 80 and/or device parameter values 82 may also be stored in one or more of the different databases 16, 38, 46 in the control system 12, and/or in other databases, as desired.

In this manner, each network access point 28 can be quickly and accurately provisioned without the need for manual input of each individual network parameter value and/or device parameter value. This also permits multiple network access points 28 to be quickly and easily grouped into different access point groups 30, which may be part of their own individual network and/or sub-network, as desired. In this embodiment for example, network access points 28(1)-28(N) are grouped together in a common access point group 30, which may be defined by and/or associated with a specific customer, account, network, or other parameter, for example. Additional parameters associated with the access point group 30 may be automatically generated using similar processes, based on other parameters of the different network access points 28 and/or on the network configuration data provided by the account manager device 22, for example. Additional network access points 28(3)-28(M) may be similarly automatically provisioned with parameters based on the network configuration data received from the account manager device 22 and on the requests received from the remote manager device 26, as needed.

Figure 3A:
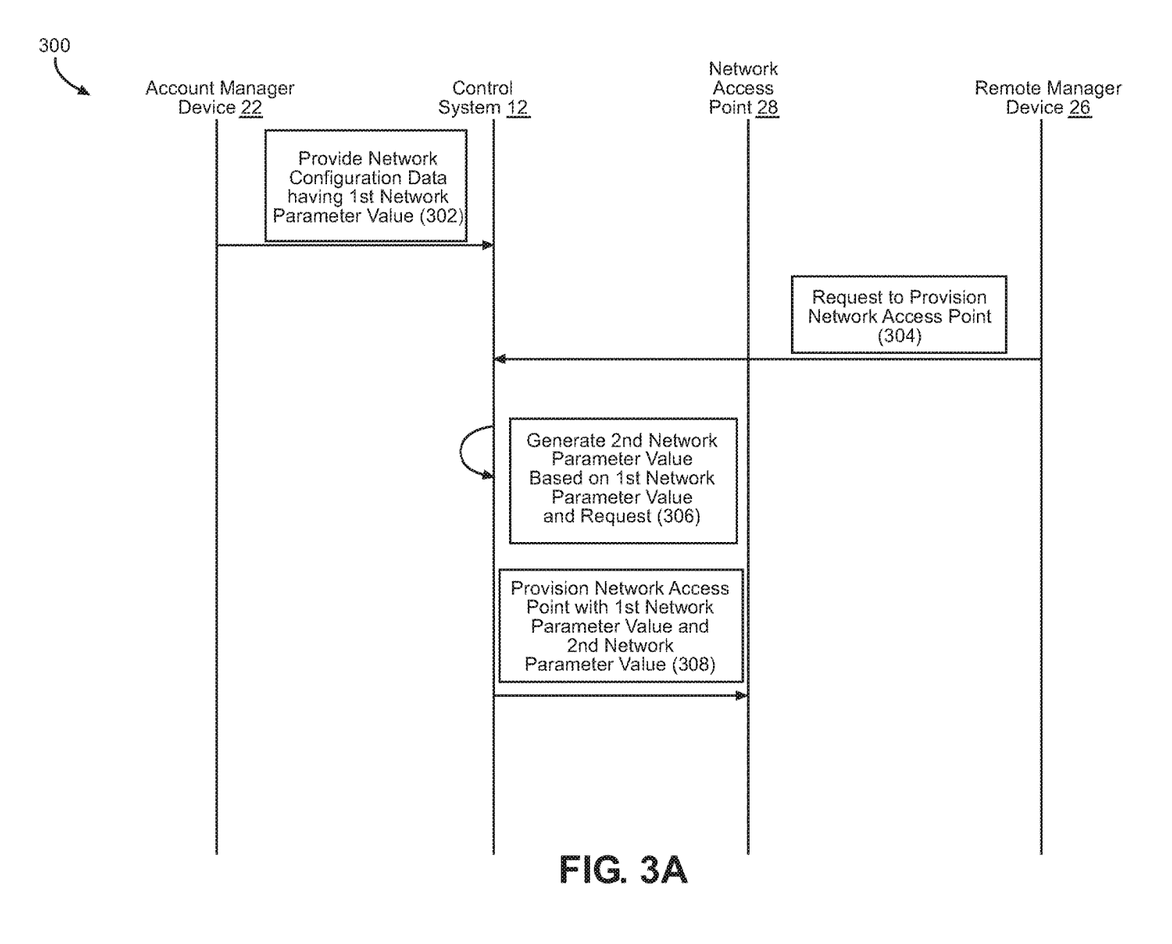
FIG. 3A is a communication diagram illustrating a method of using a control system to automatically provision one or more network access points, according to an embodiment.

In this regard, FIG. 3A is a communication diagram illustrating a method 300 of using the control system 12 to automatically provision one or more network access points 28, according to an embodiment. First, the account manager device 22 provides network configuration data to the control system 12 (Block 302). The network configuration data has a first network parameter value for a first network parameter, such as the first network parameter value 78 of FIG. 2, for example. Next, the remote manager device 26 provides a request to automatically provision one or more network access points 28 with the first network parameter value and another network parameter value for a different parameter, such as the second network parameter value 80 of FIG. 2 (Block 304). The control system 12 uses both the request and the first network parameter value to generate the second network parameter value (Block 306). The control system 12 then provisions the network access point(s) 28 with the first network parameter value and the second network parameter value (Block 308).

Figure 3B:
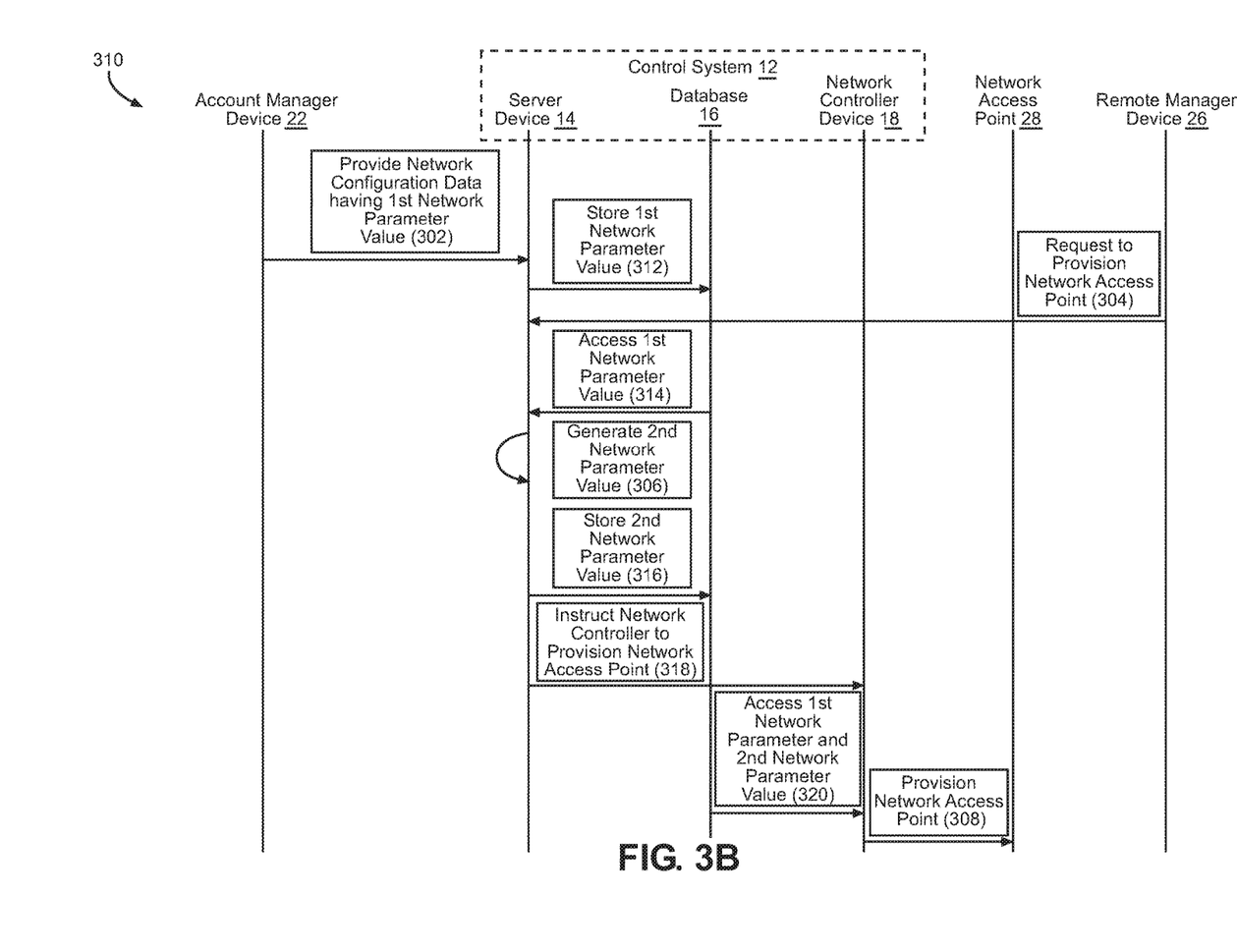
FIG. 3B is a communication diagram illustrating a method of using a control system to automatically provision network access points, according to another embodiment.

Referring now to FIG. 3B, a more detailed communication diagram illustrates a method 310 of using the control system 12 to automatically provision one or more network access points 28, according to another embodiment. In this embodiment, the method 310 includes many of the same steps as the method 300 of FIG. 3A above, but it should be understood that other variations are contemplated. First, the account manager device 22 provides network configuration data having a first network parameter value, such as the first network parameter value 78 of FIG. 2, to the server device 14 of the control system 12 (Block 302). The server device 14 stores the first network parameter value in the database 16 (Block 312). Next, the remote manager device 26 provides a request to the server device 14 to automatically provision one or more network access points 28 with the first network parameter value and another network parameter value for a different parameter, such as the second network parameter value 80 of FIG. 2 (Block 304). The server device 14 accesses the first network parameter value from the database 16 (Block 314) and generates the second network parameter value based on the request and the first network parameter value (Block 306). The server device 14 stores the second network parameter value in the database 16 (Block 316). The server device 14 next instructs the network controller device 18 to provision a network access point 28 (Block 318). The network controller device 18 accesses the first network parameter value and the second network parameter value from the database 16 (Block 320), and provisions the network access point 28 with the first network parameter value and the second network parameter value (Block 308).

In some embodiments, the server device 14 may provide the different network parameter values to the database 16 and/or the network controller device 18 at different times. In one embodiment, for example, the first network parameter value may be manually entered via the account manager program 56 and provided to the network controller device 18 at a first time. The remote manager program 64 may submit the request to the server device 14 at a second time different from the first time, at which point the server device 14 would generate the second network parameter value and provide the second network parameter value to the network controller device 18.

Figure 4:
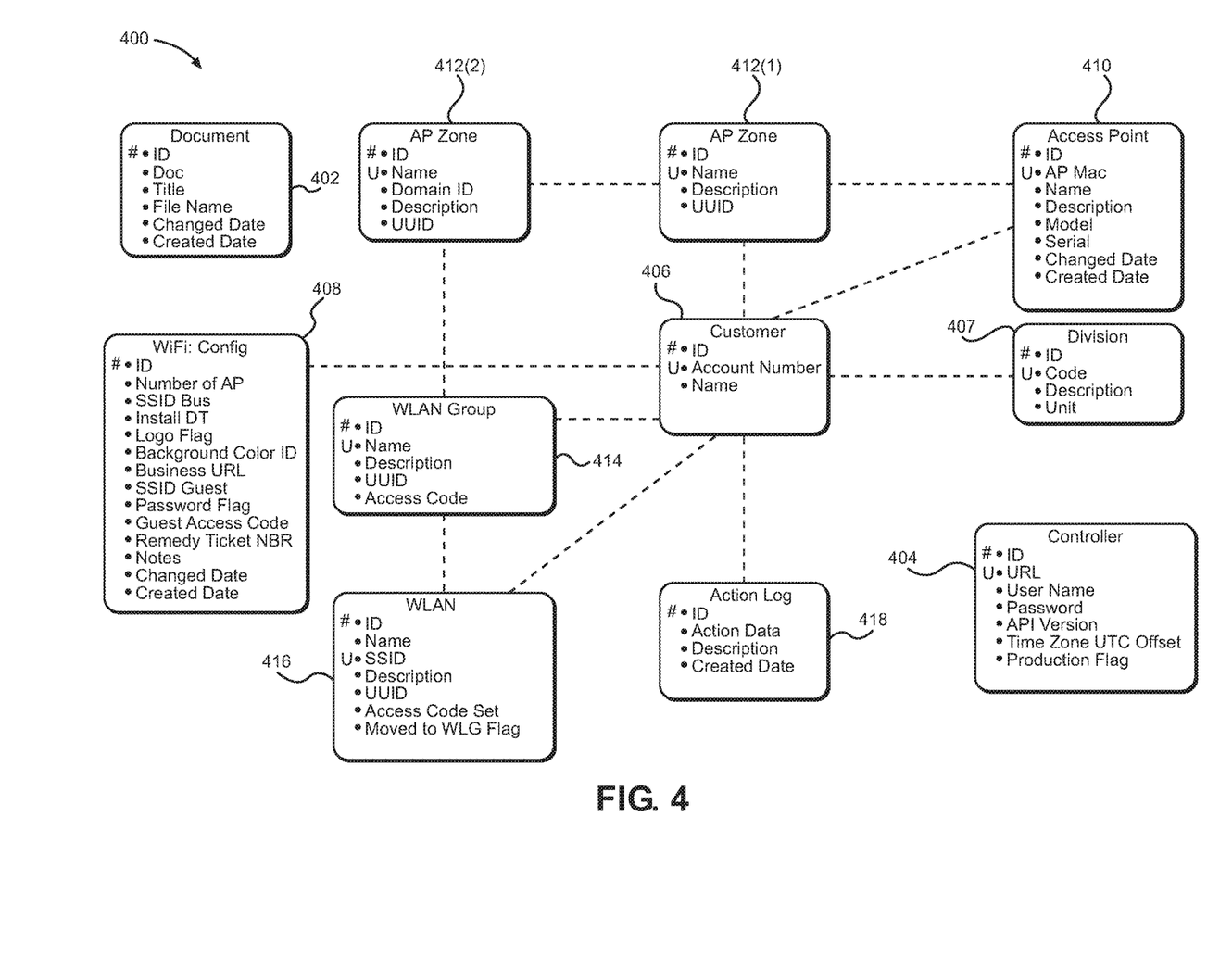
FIG. 4 is a parameter mapping diagram illustrating a plurality of different types of network parameters and other types of parameters, which can be generated and used in the methods of automatically provisioning network access points illustrated in FIGS. 3A and 3B, according to an embodiment.

These and other methods may be used to automatically provision a large number of network access points with a large number of network parameter values and other types of parameter values. In this regard, FIG. 4 is a parameter mapping diagram 400 illustrating a plurality of different types of network parameters and other types of parameters that can be generated and stored for use in automatically provisioning network access points. The parameters illustrated by the parameter mapping diagram 400 may represent parameters that are stored in the database 16 and/or in other databases. For example, the database 16 may store a variety of documents, and may include network parameter values for a number of different document parameters 402, including, for example, a document identifier (ID), type, title, file name, modification date, and/or created date. The database 16 may also store access credentials 404 for the network controller device 18 or other components of the network system 10 of FIGS. 1 and 2, which may include a controller ID, URL address, user name, password, API version, time zone, and/or production flag.

The database 16 may also include values for a number of customer parameters 406, such as, for example, ID, account number, and/or a name. In many embodiments, the first network parameter value 78 of FIG. 2 may correspond to one or more of these customer parameters 406. It should be understood that any number of other types of network parameter values could also be used as the first network parameter value 78, as desired. Additional network parameter values for division parameters 407, i.e., parameters relating to larger or smaller groups associated with one or more customers, may also be stored in the database 16, including, for example, division ID, division code, division description, and/or division unit.

The database 16 may also store network parameter values relating to WiFi configuration parameters 408, including, for example, configuration ID, number of network access points, single sign-on ID (SSID) bus, install data table (DT), logo flag, background color ID, business URL, SSID guest, password flag, guest access code, remedy ticket NBR, notes, modification date, and/or created date. Each network access point, such as network access points 28, may also have a number of access point parameters 410, including, for example, an access point ID, MAC address, name, description, model, serial number, modification date, and/or created date. In many embodiments, the second network parameter value 80 of FIG. 2 may correspond to one or more of these access point parameters 410. For example, an access point name value for an access point may be automatically generated based on one or more values of a customer parameter 406 stored on the server device 14, such a customer name or customer account number. The access point name value may include a first portion of a value of a customer parameter 406, or all of the values of the customer parameters 406, as desired. In some embodiments, additional identification may be included in a second portion of the access point name value as well, such as a unique number or ID, to generate a unique network parameter value for the respective network access point 28.

As discussed above, an access point group 30 may include a plurality of network access points 28. Multiple access point groups 30 may also include overlapping and/or nested groups of network access points 28, as desired. In this regard, a number of different types of access point zone parameters 412(1) and 412(2), WLAN group parameters 414, WLAN parameters 416, and or division parameters 407 may be used to identify and distinguish between the different access point groups 30. Examples of parameters that may be associated with some or all of these types of access point groups 30 include, for example, group ID, name, description, universally unique identifier (UUID), domain ID, access code, whether an access code has been set, and/or WLG flag.

The control system 12 may also generate an action log, with each entry including a plurality of action log parameters 418 to be stored in the database 16, such as, for example, action ID, action data, description, and date created. The values for these action log parameters 418 may be selectively accessed to review or troubleshoot actions taken by the control system 12, or as part of the methods of FIGS. 3A or 3B, for example.

Figure 5:
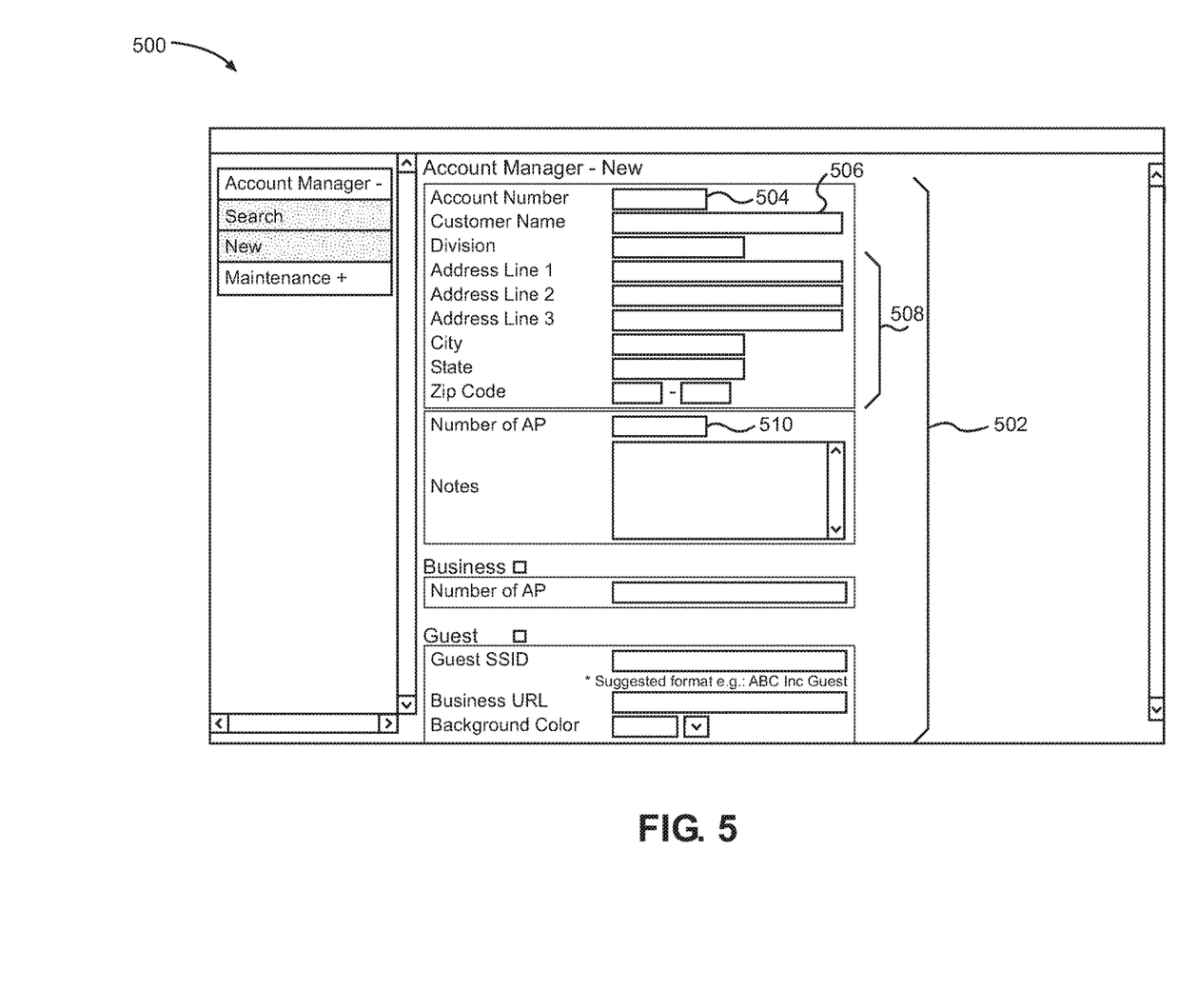
FIG. 5 is a diagram illustrating a graphical user interface for an account manager program illustrated in FIG. 2, according to an embodiment.

The account manager program 56 and the remote manager program 64 may each include one or more user interfaces for providing the functionality disclosed herein. In this regard, FIG. 5 is a diagram illustrating a graphical user interface 500 for the account manager program 56, according to an embodiment. In this embodiment, the graphical user interface 500 includes a plurality of input fields 502 for populating one or more network parameter values, such as, an account number 504, a customer name 506, address and contact information 508, a number of access points 510 associated with the account number, and other information. One or more of the plurality of input fields 502 may be used as one or more first network parameter values 78, for example, during provisioning of one or more network access points 28.

Figure 6:
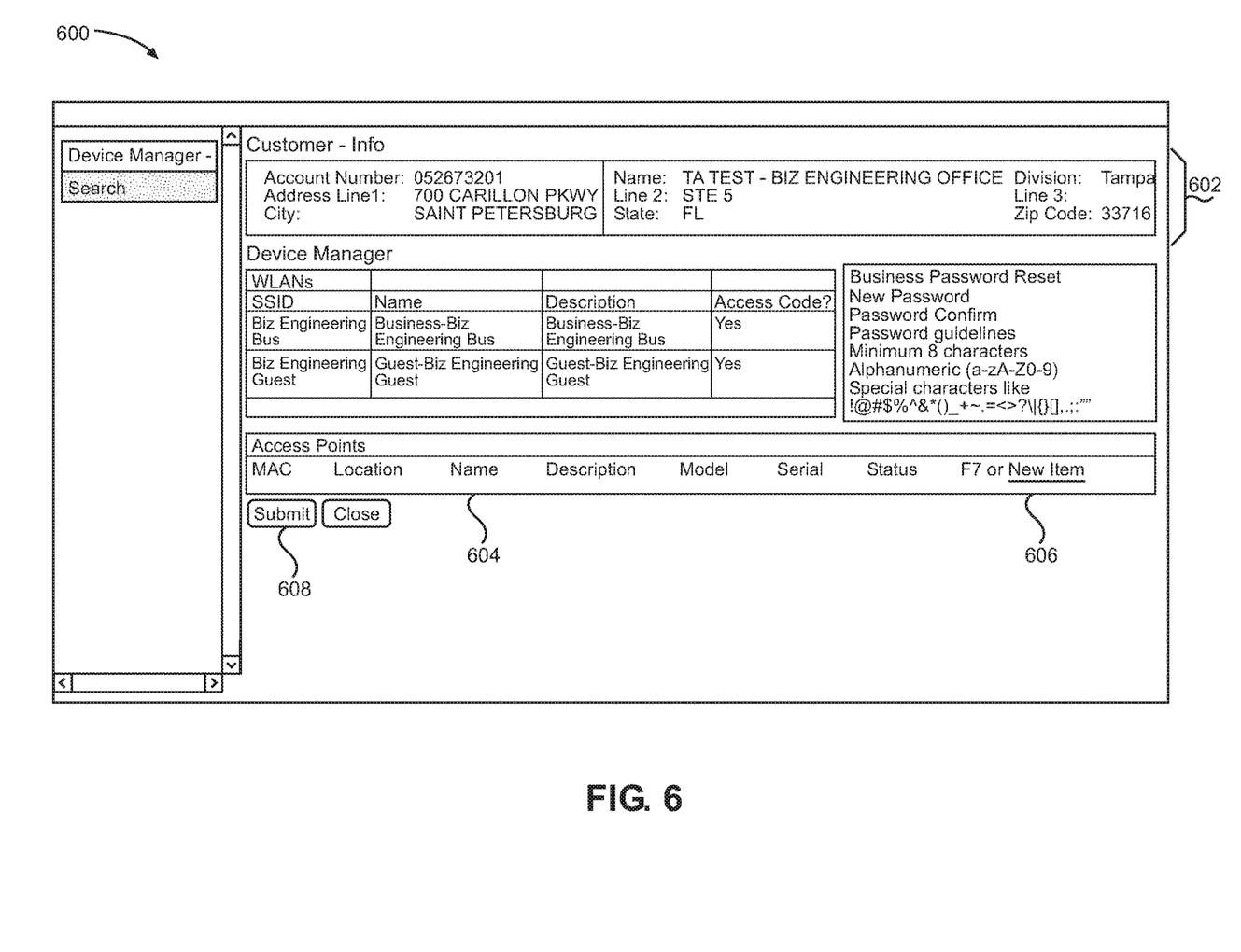
FIG. 6 is a diagram illustrating a graphical user interface for the remote manager program illustrated in FIG. 2, according to an embodiment.

To request automatic provisioning of the network access points 28, FIG. 6 is a diagram illustrating a graphical user interface 600 for the remote manager program 64, referred to herein as a device manager, according to an embodiment. The graphical user interface 600 may include a customer information display 602 and may also include a listing of access point groups, which may correspond to the access point group 30 of FIG. 2. In this and other embodiments, some of the access point groups may alternatively be referred to herein as wireless local access networks (WLANs). The graphical user interface 600 for the remote manager program 64 may also include a listing 604 of network access points, such as the network access points 28. In this regard, when installing additional network access points, an installer or technician may select a new item 606 option to add new network access points to a particular access point group. In this embodiment, for example, the submit button 608 provides the request to provision the listed network access points 28 to the control system 12.

Figure 7A:
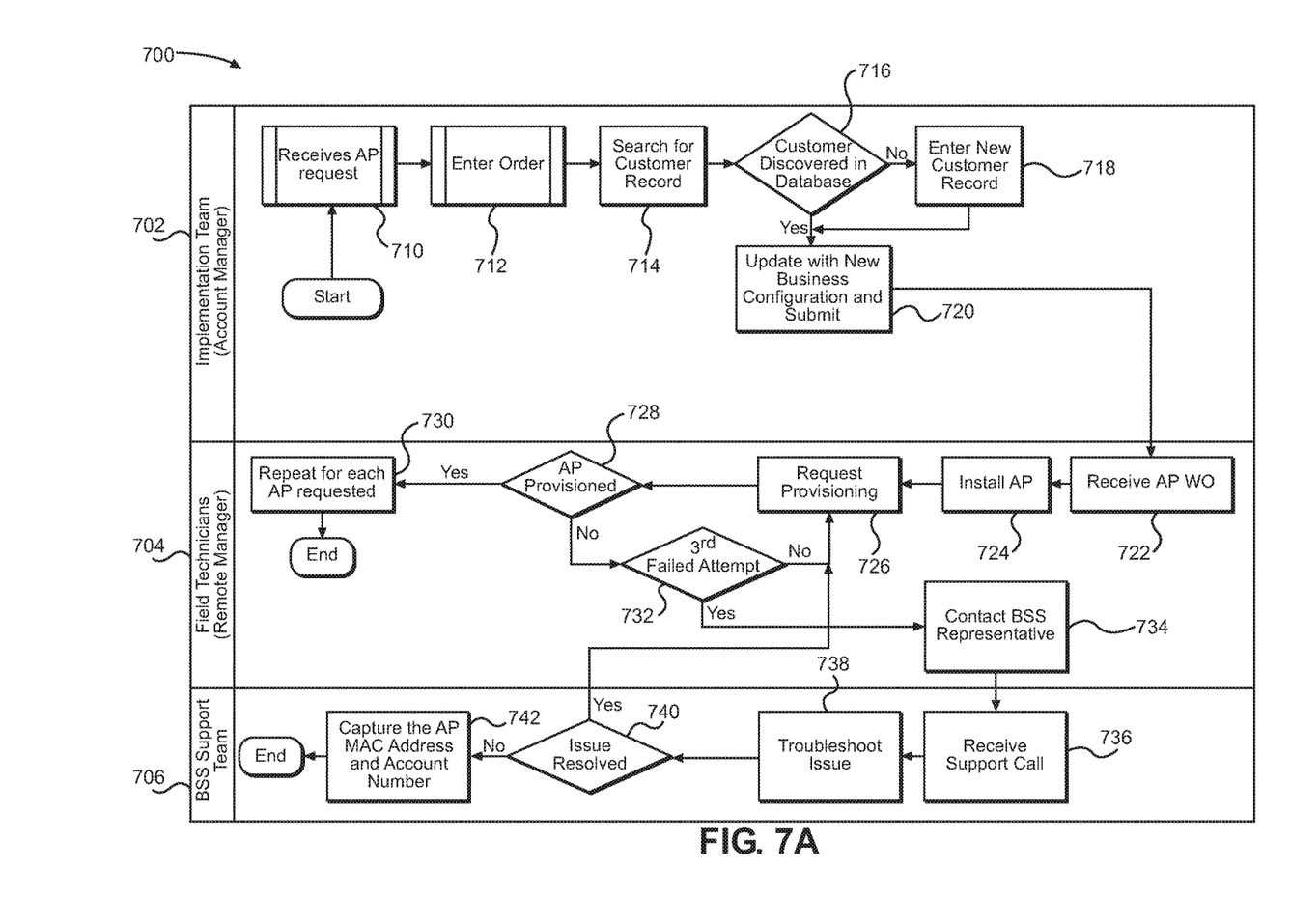
FIG. 7A is a flowchart diagram illustrating a process for installing and provisioning a plurality of access points for a newly installed network, according to an embodiment.

As discussed above, embodiments of the disclosure may be practiced during installation of a network. In this regard, FIG. 7A is a flowchart diagram illustrating a process 700 for installing and provisioning a plurality of access points (APs), such as the network access points 28, for a newly installed network, according to an embodiment. In this embodiment, the process 700 is divided among three business groups: an implementation team 702, which uses the account manager device 22, field technicians 704, who use the remote manager device 26, and a business support solution (BSS) support team 706, which troubleshoots and manages the installed network. Using the account manager device 22, the implementation team 702 receives a request to install a new access point (Block 710), and enters an order (Block 712) based on the request. The implementation team 702 searches for a customer record (Block 714) associated with the request to determine if the customer is already in the database (Block 716). If no customer record exists, the implementation team 702 enters new customer information (Block 718). The new customer record is then updated with a new business configuration corresponding to the order (Block 720).

Next, one or more field technicians 704 receives a work order (WO) for accessing the remote manager device 26 to install and provision the access point (Block 722). The WO may be received via the remote manager device 26 directly, or may be received separate from the remote manager device 26, such as via a separate billing system, a telephone call, an email, etc. The field technician physically installs the access point (Block 724) and uses the remote manager device 26 to request provisioning for the access point (Block 726). The field technician then determines, via the remote manager device 26, whether the provisioning was successful (Block 728). If the provisioning was successful, the process is repeated for each requested access point (Block 730). If the provisioning was not successful, the provisioning is attempted again until a threshold number of failed attempts (three in this embodiment) has been reached (Block 732), upon which a BSS representative from the BSS support team 706 is contacted (Block 734). The BSS support team 706 representative receives the support call from the field technician 704 (Block 736). After troubleshooting the issue (Block 738), the BSS support team 706 representative determines if the issue has been resolved (Block 740). If the issue has been resolved, the field technician 704 uses the remote manager device 26 to attempt to provision the access point again. If the issue is not resolved, the MAC address and account number of the access point is captured (Block 742), and the provisioning process is aborted for that particular access point.

Figure 7B:
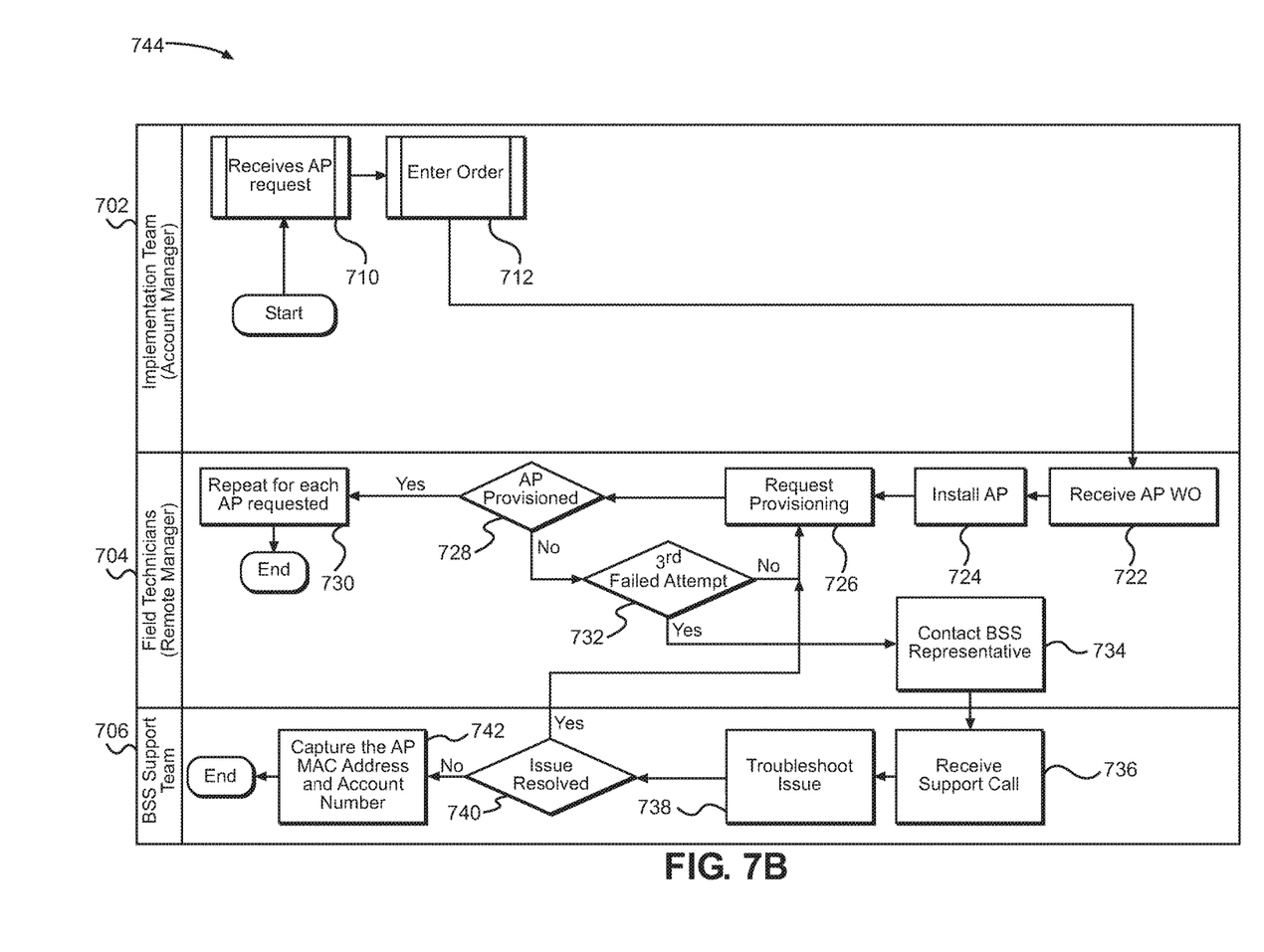
FIG. 7B is a flowchart diagram illustrating a process for provisioning a plurality of access points being added to an existing network, according to an embodiment.

Embodiments of the disclosure may also be used to add additional access points to existing installed networks. In this regard, FIG. 7B is a flowchart diagram illustrating a process 744 for provisioning a plurality of network access points being added to an existing network, according to an embodiment. In this embodiment, using the account manager device 22, the implementation team 702 receives a request to install a new network access point (Block 710) and enters an order (Block 712) based on the request. Because the order relates to an expansion of an existing network, the customer search steps may be omitted. The field technician(s) 704 use the remote manager device 26 to receive the access point WO (Block 722) and install and provision the access point (Blocks 724-734), in a manner similar to the corresponding portion of the process 700 of FIG. 7A. If provisioning the access point is not successful, a BSS support team 706 representative troubleshoots the issue (Blocks 736-742), as described above with respect to FIG. 7A. It should be understood that these and other process steps may also be used, modified, duplicated, or omitted, as desired.

Figure 8:
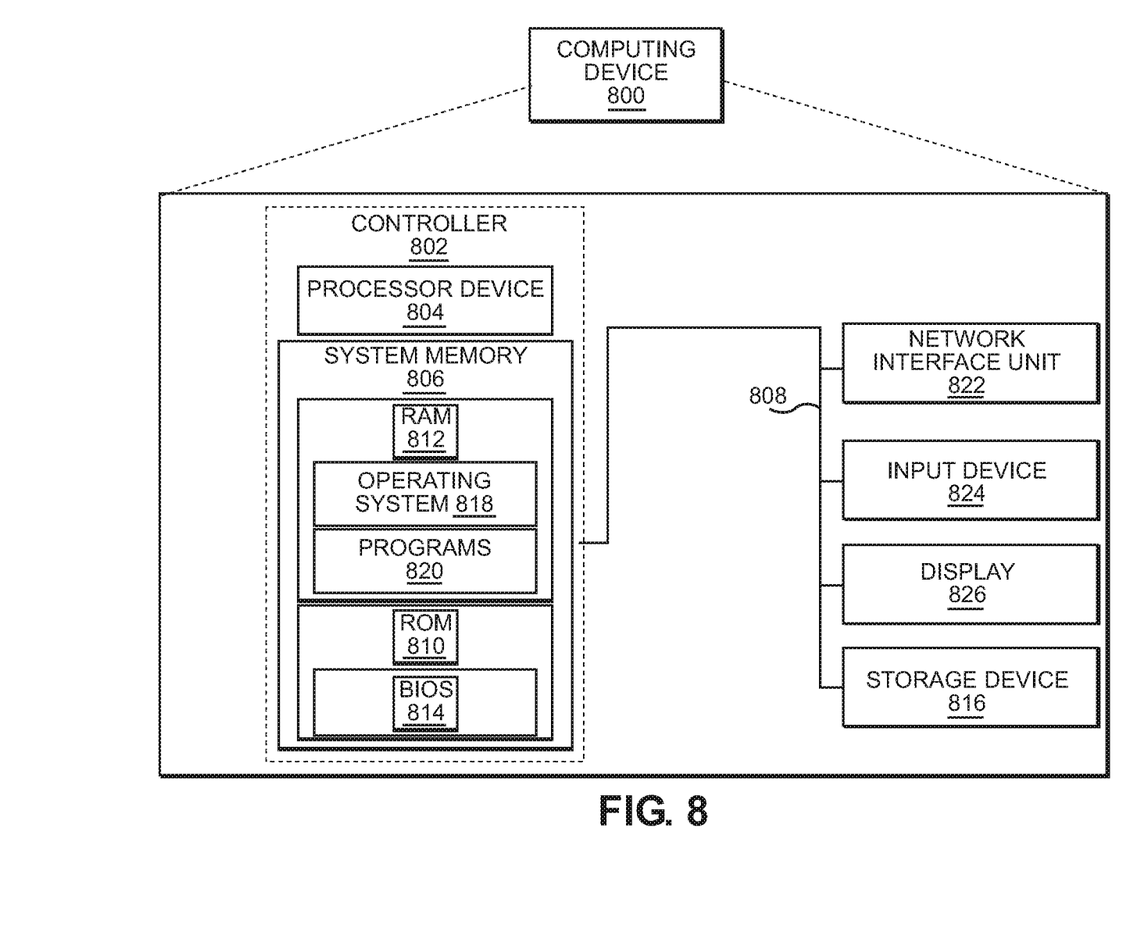
FIG. 8 is a schematic diagram of a computing device suitable for use as part of any of the computing devices illustrated in FIGS. 1 and 2, according to an embodiment.

The components and features herein may be embodied in one or more computing devices or computer-readable media having computer-readable instructions, operable for performing methods disclosed herein. In this regard, FIG. 8 is a schematic diagram of a computing device 800 suitable for use as one or more of the components of a system, such as the network system 10 or the control system 12 of FIGS. 1 and 2, according to an embodiment. It should be understood, however, that aspects of the computing device 800 described herein may be used as part of or in connection with other devices or components as well. In this embodiment, the computing device 800 may comprise any computing or processor device capable of including firmware, hardware, and/or executing software instructions to implement the functionality described herein, and which are capable of being incorporated into components of the computing device 800. In this example, the computing device 800 of FIG. 8 includes a controller 802 having a processor device 804, a system memory 806, and a system bus 808. The system bus 808 provides an interface for system components including, but not limited to, the system memory 806 and the processor device 804. The processor device 804 can be any commercially available or proprietary processor device.

The system bus 808 may be any of several types of bus structures that may further interconnect to a memory bus (with or without a memory controller), a peripheral bus, and/or a local bus using any of a variety of commercially available bus architectures. The system memory 806 may include non-volatile memory 810 (e.g., read only memory (ROM), erasable programmable read-only memory (EPROM), electrically erasable programmable read-only memory (EEPROM), etc., and/or volatile memory 812 (e.g., random-access memory (RAM)). A basic input/output system (BIOS) 814 may be stored in the non-volatile memory 810 and can include the basic routines that help to transfer the information between the elements within the computing device 800.

The computing device 800 may further include a computer-readable storage device 816, which may comprise, for example, internal solid state memory, or the like. The computer-readable storage device 816 may provide non-volatile storage of the data, the data structures, the computer-executable instructions, and the like. The data structures can store information relating to, for example, broadcast programs, media, or user information. Computer-executable instructions may include pre-defined data processing instructions, or downloaded instructions for data processing at a specified time or interval, for example.

A number of modules can be stored in the computer-readable storage device 816 and/or in the volatile memory 812, including an operating system 818 and one or more programs 820, which may implement the functionality described herein in whole or in part.

In addition, the computing device 800 may include additional components, such as a network interface unit 822 or other communications interface, one or more input devices 824, and a display 826 or other visual indicator interface. The components of the computing device 800 may interact with other components outside of the computing device 800, such as the network 50 of FIG. 2, via the network interface unit 822 or other communications interface.

Those skilled in the art will recognize improvements and modifications to the preferred embodiments of the disclosure. All such improvements and modifications are considered within the scope of the concepts disclosed herein and the claims that follow.

What is claimed is:

1. A method of automatically provisioning a network access point, the method comprising:
   receiving, by a control system comprising a processor device, network configuration data from a first computing device, the network configuration data comprising a first network parameter value for a first network parameter;
   receiving, by the control system from a second computing device, a request to provision a network access point with the first network parameter value for the first network parameter and with a second network parameter value for a second network parameter different from the first network parameter;
   automatically generating, by the control system, the second network parameter value based on the request and the first network parameter value; and
   providing, by the control system to the network access point, the first network parameter value and the second network parameter value.

2. The method of claim 1, wherein automatically generating the second network parameter value based on the request and the first network parameter value comprises automatically generating a unique second network parameter value for the network access point based on the request and the first network parameter value.

3. The method of claim 1, wherein the request to provision the network access point comprises a device parameter value for a first device parameter of the network access point.

4. The method of claim 3, wherein automatically generating the second network parameter value based on the request and the first network parameter value comprises automatically generating the second network parameter value based on the request, the first network parameter value, and the device parameter value.

5. The method of claim 1, wherein the first network parameter is one of: an account number, a customer name, a customer address, a network name, a user name, or a user password.

6. The method of claim 5, wherein the second network parameter is one of: a network address of the network access point, a Media Access Control (MAC) address of the network access point, a serial number of the network access point, or a location of the network access point.

7. The method of claim 1, wherein the second network parameter value comprises a first portion comprising at least part of the first network parameter value.

8. The method of claim 7, wherein the second network parameter value comprises a second portion comprising unique identifying information for the network access point.

9. The method of claim 1, wherein the control system comprises a network controller device.

10. The method of claim 9, wherein the control system comprises a server.

11. The method of claim 10, wherein providing, by the control system to the network access point, the first network parameter value and the second network parameter value comprises:
providing, by the server, the first network parameter value to a network controller device at a first time;
providing, by the server, the second network parameter value to the network controller device at a second time; and
instructing the network controller device, by the server, to provide the first network parameter value and the second network parameter value to the network access point.

12. A controller device for automatically provisioning a network access point, the controller device comprising:
a processor device;
a memory; and
a network interface unit configured to:
receive network configuration data from a first computing device, the network configuration data comprising a first network parameter value for a first network parameter; and
receive, from a second computing device, a request to provision a network access point with the first network parameter value and with a second network parameter value for a second network parameter different from the first network parameter,
wherein the memory comprises computer-readable instructions configured to automatically direct the processor device to:
generate the second network parameter value based on the request and the first network parameter value; and
provide the first network parameter value and the second network parameter value to the network access point.

13. The controller device of claim 12, wherein the controller device further comprises a first controller device and a second controller device configured to communicate with the first controller device,
wherein the processor device comprises:
a first processor device associated with the first controller device; and
a second processor device associated with the second controller device, and wherein the memory comprises:
a first memory associated with the first controller device, the first memory comprising computer-readable instructions configured to automatically direct the first processor device to generate the second network parameter value; and
a second memory associated with the second controller device, the second memory comprising computer-readable instructions configured to automatically direct the second processor device to provide the first network parameter value and the second network parameter value to the network access point.

14. The controller device of claim 13, wherein the first controller device is a server configured to communicate with the first computing device, and wherein the second controller device is a network controller device configured to communicate with the network access point.

15. The controller device of claim 14, wherein the server is configured to communicate with the second computing device.

16. The controller device of claim 14, wherein the network controller device is configured to communicate with the second computing device.

17. A network system comprising:
a network access point; and
a controller device comprising:
a processor device;
a memory; and
a network interface unit configured to:
receive network configuration data from a first computing device, the network configuration data comprising a first network parameter value for a first network parameter; and
receive, from a second computing device, a request to provision the network access point with the first network parameter value and with a second network parameter value for a second network parameter different from the first network parameter;
wherein the memory comprises computer readable instructions configured to automatically direct the processor device to:
generate the second network parameter value based on the request and the first network parameter value; and
provide the first network parameter value and the second network parameter value to the network access point.

18. The network system of claim 17, further comprising the first computing device.

19. The network system of claim 18, further comprising the second computing device.

20. A non-transitory computer-readable medium comprising machine-readable instructions for directing a processor device to perform a method comprising:
receiving, from a first computing device, network configuration data comprising a first network parameter value for a first network parameter;
receiving, from a second computing device, a request to provision a network access point with the first network parameter value and with a second network parameter value for a second network parameter different from the first network parameter;
automatically generating the second network parameter value based on the request and the first network parameter value; and
providing the first network parameter value and the second network parameter value to the network access point.

21. A method of automatically provisioning a network access point, the method comprising:
receiving, by a control system comprising a processor device, a network controller, and a server, network configuration data from a first computing device, the network configuration data comprising a first network parameter value for a first network parameter;

receiving, by the control system from a second computing device, a request to provision a network access point with the first network parameter value for the first network parameter and with a second network parameter value for a second network parameter different from the first network parameter;

automatically generating, by the control system, the second network parameter value based on the request and the first network parameter value;

providing, by the control system to the network access point, the first network parameter value to a network controller device at a first time;

providing, by the server, the second network parameter value to the network controller device at a second time; and instructing the network controller device, by the server, to provide the first network parameter value and the second network parameter value to the network access point.

* * * * *